Feb. 8, 1966         G. M. COOKE         3,233,620
SIMPLE LEAKPROOF METHOD OF PUMPING LIQUIDS OUT OF A VACUUM
Filed Feb. 5, 1963
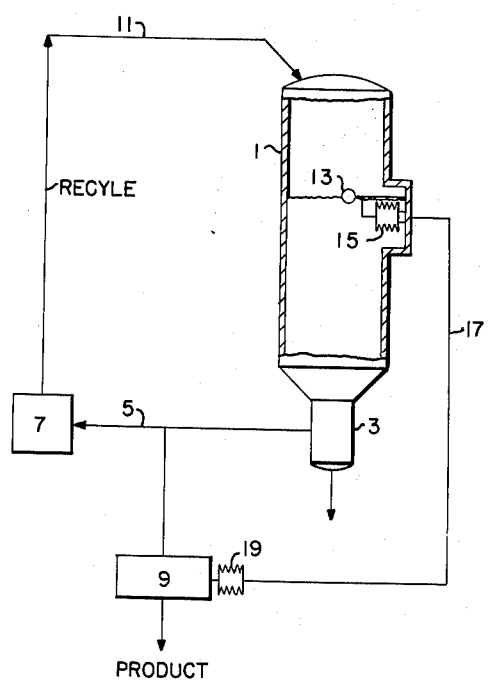
Gordon M. Cooke    Inventor
By W. O. Heilman
Patent Attorney

United States Patent Office 3,233,620
Patented Feb. 8, 1966

3,233,620
SIMPLE LEAKPROOF METHOD OF PUMPING LIQUIDS OUT OF A VACUUM
Gordon M. Cooke, Sarnia, Ontario, Canada, assignor to Esso Research and Engineering Company, a corporation of Delaware
Filed Feb. 5, 1963, Ser. No. 256,388
2 Claims. (Cl. 137—2)

This invention relates to a method of removing liquid from a vacuum system and more particularly to maintaining the level in a vacuum system by continuous or intermittent removal of a liquid therefrom.

In the past, there have existed many problems in removing liquid from a vacuum system. For example, in removing liquids from a reboiler in a distillation column there have been difficulties due to leaks, vapor locks, and loss of priming in the pump, to name a few. In short, the systems utilizing a suction line to remove the liquid from the vacuum system have various disadvantages.

It is therefore an object of this invention to provide a method of continuous or intermittent removal of a liquid from a vacuum system without difficulties due to leaks, vapor locks and the like. The object of this invention is attained by utilizing a fully immersed pump, for example, a gear pump. This pump is immersed in a liquid contained within the vacuum system and is used to build up pressure against a controller in a recycle system. The controller is set at a pressure greater than 15 p.s.i.a. if the product is to be removed at atmospheric conditions. With this high pressure leg in the recycle system the liquid may be removed from said pressure leg by simply opening a valve.

The invention is best understood by examining the attached drawing, wherein is shown a reboiler 1. The reboiler pump 3, for example, a simple gear pump is mounted so as to be fully immersed in the liquid contained in the reboiler. Because of the high temperatures the face gasket and the O-rings on the shaft of this pump are replaced by similar ones made of Viton A, a new fluorocarbon elastomer made by E. I. du Pont de Nemours and Co., Inc.

The pump so mounted has no suction line and hence much of the trouble associated with pumping out of a vacuum is eliminated. Communicating with the pump is the high pressure leg 5 of the recycle system. Pressures are maintained in this leg by means of a pressure controller 7. Liquid is taken in by the pump and forced against the back pressure controller 7, which is set to open at a suitable pressure, for example, 20 p.s.i.a. Thus, when the pump is turning at a speed slightly higher than necessary to hold the regulator open a valve 9, for example a solenoid valve, connected to a T in the high pressure leg, can be opened to remove liquid from the system under vacuum. This, of course, can be done continuously or intermittently. Any of a number of suitable pressure regulators can be used. For example, the back pressure regulator 90–W made by Grove Regulator Company is suitable. Leading from the pressure controller is the recycle line 11 which communicates with the reboiler so as to permit the liquid which is passed through the pressure controller to return to the reboiler.

The reboiler is also equipped with a float liquid level sensor 13. The level sensor 13 can be coordinated with the solenoid valve 9 so that the valve is automatically opened when the level in the reboiler reaches a predetermined height. The transmission of the signal from the level sensor to the solenoid valve can be accomplished by a number of known means. For example, as described in "Industrial Instrumentation" by Eckman, 1957, on page 251, the movement of the float can cause a displacement of a metallic bellows 15, which is solidly filled with oil. The displacement of oil is then carried by the tube 17 to an identical receiving bellows 19 at the solenoid valve. Alternatively, though not shown in the drawing, a relay can be mounted near the reboiler with a sensing loop at the point where the level control is desired. The output from the relay circuit replaces the output of the tachometer on the pump motor. Thus, when a float rises near the sensing loop, the motor gradually speeds up the pump until full speed is attained.

The combination thus described performs well at atmospheric pressure and accomplishes with practically no attention at all what is normally a tedious and time-consuming job.

Thus it is seen that this invention provides a method of continuously or intermittently and automatically removing liquid from a vacuum system. The invention has been described herein with a certain degree of particularity. It is to be understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. The method of removing a volume of liquid from a sealed container under vacuum without entry thereto of a corresponding volume of air comprising the steps of maintaining a head on the pumping means with the liquid to be removed from the system, pumping liquid from the lower portion of said container through a conduit, maintaining a fluid pressure greater than ambient in a portion of said conduit measuring the level of said liquid in said container, bleeding a portion of the pumped liquid from the portion of said conduit under greater than ambient pressure automatically when a predetermined liquid level is exceeded, and returning the remainder of the pumped liquid to said container whereby liquid is removed from said container without the introduction thereto of an equivalent volume of gas.

2. A method according to claim 1 wherein said fluid pressure is maintained at a pressure greater than 15 p.s.i.a.

References Cited by the Examiner
UNITED STATES PATENTS

| | | | |
|---|---|---|---|
| 1,764,825 | 6/1930 | Browne | 137—398 X |
| 2,266,354 | 12/1941 | Christenson | 222—318 X |
| 2,331,435 | 10/1943 | Stambaugh | 222—318 X |
| 2,717,106 | 9/1955 | Hammer | 222—318 |
| 3,018,633 | 1/1962 | Halliwell | 62—55 X |

M. CARY NELSON, *Primary Examiner.*

ISADOR WEIL, WILLIAM F. O'DEA, *Examiners.*